(12) United States Patent
Isobe et al.

(10) Patent No.: US 7,441,130 B2
(45) Date of Patent: Oct. 21, 2008

(54) STORAGE CONTROLLER AND STORAGE SYSTEM

(75) Inventors: Daisuke Isobe, Odawara (JP); Azuma Kano, Hiratsuka (JP); Takahiko Iwasaki, Nakai (JP); Tsuyoshi Sasagawa, Ninomiya (JP); Midori Kurokawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 467 days.

(21) Appl. No.: 11/224,110

(22) Filed: Sep. 13, 2005

(65) Prior Publication Data
US 2007/0006001 A1 Jan. 4, 2007

(30) Foreign Application Priority Data
Jul. 4, 2005 (JP) .............................. 2005-195596

(51) Int. Cl.
*G06F 1/00* (2006.01)
*G06F 13/00* (2006.01)
(52) U.S. Cl. .................... 713/300; 713/310; 711/114
(58) Field of Classification Search ................. 713/300, 713/320, 324, 330; 361/683
See application file for complete search history.

(56) References Cited

U.S. PATENT DOCUMENTS

| 5,629,694 A * | 5/1997 | Simon et al. ................. 341/22 |
| 2003/0204757 A1 | 10/2003 | Flynn |
| 2004/0139260 A1 | 7/2004 | Steinmetz et al. |
| 2004/0156220 A1* | 8/2004 | Kim et al. ..................... 363/97 |
| 2005/0064829 A1 | 3/2005 | Kang et al. |
| 2005/0141184 A1* | 6/2005 | Suzuki et al. ............... 361/683 |

* cited by examiner

*Primary Examiner*—Suresh K Suryawanshi
(74) *Attorney, Agent, or Firm*—Reed Smith LLP; Stanley P. Fisher, Esq.; Juan Carlos A. Marquez, Esq.

(57) ABSTRACT

A controller performs data communication with a host system based on fiber channel protocol and controls data input/output to or from a SATA disk drive. The controller includes an FC/SATA converter powered by a main power supply, and a resource management processor powered by a standby power supply. The resource management processor controls the power supply from the main power supply to the FC/SATA converter.

7 Claims, 19 Drawing Sheets

| GPIO-A | GPIO-B | PORT NUMBER REVERSAL |
|--------|--------|----------------------|
| 1 | 0 | NO |
| 1 | 1 | NO |
| 0 | 0 | NO |
| 0 | 1 | YES |

STORAGE CONTROLLER AND STORAGE SYSTEM

CROSS-REFERENCE TO RELATED APPLICATION

This application relates to and claims priority from Japanese Patent Application No. 2005-195596, filed on Jul. 4, 2005, the entire disclosure of which is incorporated herein by reference.

BACKGROUND OF THE INVENTION

The present invention relates to a storage controller and a storage system.

FC protocol (Fibre Channel protocol) is known as an example of data transfer protocols favorable for a SAN (Storage Area Network). FC protocol is a data transfer protocol that has achieved high-speed transmission, reduced delay, long-distance transmission, and routing by incorporating the advantages of conventional SCSI (Small Computer System Interface) data transmission techniques and Ethernet techniques. FC protocol is divided into four layers from a physical media layer to an upper layer protocol. These respective layers are referred to as FC-0, FC-1, FC-2, and FC-4. FC-0 defines the physical media specifications of the fibre channel; FC-1 defines the encode/decode specifications of the fibre channel; FC-2 defines the frame configuration and flow control specifications of the fibre channel; and FC-4 defines the specifications for mapping a protocol, such as SCSI, IP(Internet Protocol), ATM (Asynchronous Transfer Mode), ESCON (Enterprise System Connection®) in the fibre channel.

Meanwhile, as a storage device for achieving high-speed data transmission and price-reduction, a SATA (Serial Advanced Technology Attachment) disk drive is known. In a storage system for conducting data transmission with a host system based on FC protocol and controlling data input/output to or from a SATA disk drive, an FC/SATA converter is required. US2004/0139260A1 discloses a storage system including an FC/SATA converter.

SUMMARY OF THE INVENTION

In some storage systems, two types of power supply channels, i.e., a main power supply, and a standby power supply, are provided. In storage systems with these kinds of power supply channels, having mounted an FC/SATA converter on the basic chassis controller board, it is necessary to sufficiently examine the definition of the controller board power supply boundaries, and countermeasures for failures, while considering the costs involved.

Therefore, an object of the present invention is to, upon mounting an FC/SATA converter on a controller board of a storage system basic chassis, define a power supply boundary on the controller board from the perspective of cost reduction and high reliability.

In order to achieve the above object, the storage controller according to the present invention conducts data transmission with a host system based on fibre channel protocol, and controls data input/output to or from a SATA disk drive. This storage controller includes an FC/SATA converter powered by a main power supply, and a resource management processor powered by a standby power supply. The resource management processor controls the power supply from the main power supply to the FC/SATA converter. The FC/SATA converter is preferably powered by the main power supply since it consumes a large amount of power. The resource management processor is preferably powered by the standby power supply since it monitors or controls power resources in the storage controller even when the main power supply is off.

The FC/SATA converter and the resource management processor are preferably mounted on an identical controller board, which is advantageous in terms of reducing the number of components and lowering costs.

The main power supply and standby power supply preferably are two power supply channels branching from a single power supply (e.g., UPS power supply), which eliminates the need to provide a separate power supply for each power supply channel, and thus is advantageous in terms of lowering costs.

Furthermore, it is preferable that the resource management processor and the FC/SATA converter are interconnected via a dedicated signal line for reset processing so that the resource management processor can reset the FC/SATA converter via that signal line. This configuration makes it impossible to avoid the inconvenience of an MPU in the storage controller being reset simultaneously when the resource management processor resets the FC/SATA converter.

Also, it is preferable that the resource management processor and the FC/SATA converter mutually check each other's operating status, and that the resource management processor resets the FC/SATA converter if the FC/SATA converter is operating normally. The resource management processor and the FC/SATA converter are each powered by separate power supply channels, and thus, they start up asynchronously. Therefore, the resource management processor and the FC/SATA converter mutually check each other's operating status via the dedicated signal line for reset processing, making stable resetting of the FC/SATA converter possible.

A favorable timing for resetting the FC/SATA converter is, for example, when FC/SATA conversion firmware is downloaded to the FC/SATA converter, or immediately after power from the main power supply is applied to the FC/SATA converter.

In order to achieve the aforementioned object, the storage system according to the present invention conducts data communication with a host system based on fibre channel protocol, and has a controller for controlling data input/output to or from a SATA disk drive in its basic chassis. The storage controller includes an FC/SATA converter powered by a main power supply, and a resource management processor powered by a standby power supply. The resource management processor controls the power supply from the main power-supply to the FC/SATA converter.

The storage system is configured so that it can be connected to an additional chassis via a fibre channel loop. The storage system, upon occurrence of a failure in the fibre channel loop, temporarily cancels the connection between the basic chassis and the additional chassis, and determines whether the cause of the failure is present in the basic chassis or the additional chassis.

The storage system may include a dual controller configuration. If the cause of the failure is present in the basic chassis, the dual controller configuration makes it possible for the storage controller causing the failure to be blocked, and also the storage controller not causing the failure to control data input/output to or from the SATA disk drive. Meanwhile, if the cause of the failure is present in the additional chassis, the connection between the storage controller causing the failure in the additional chassis and the storage controller in the basic chassis connected to that storage controller may be cancelled.

According to the present invention, when an FC/SATA converter is mounted on a controller board of a storage system basic chassis, a power supply boundary on the controller board can be defined from the perspective of cost reduction and high reliability.

DETAILED DESCRIPTION OF THE PREFERRED EMBODIMENTS

Hereinafter, an embodiment of the present invention is explained with reference to the drawings.

Figure 1:
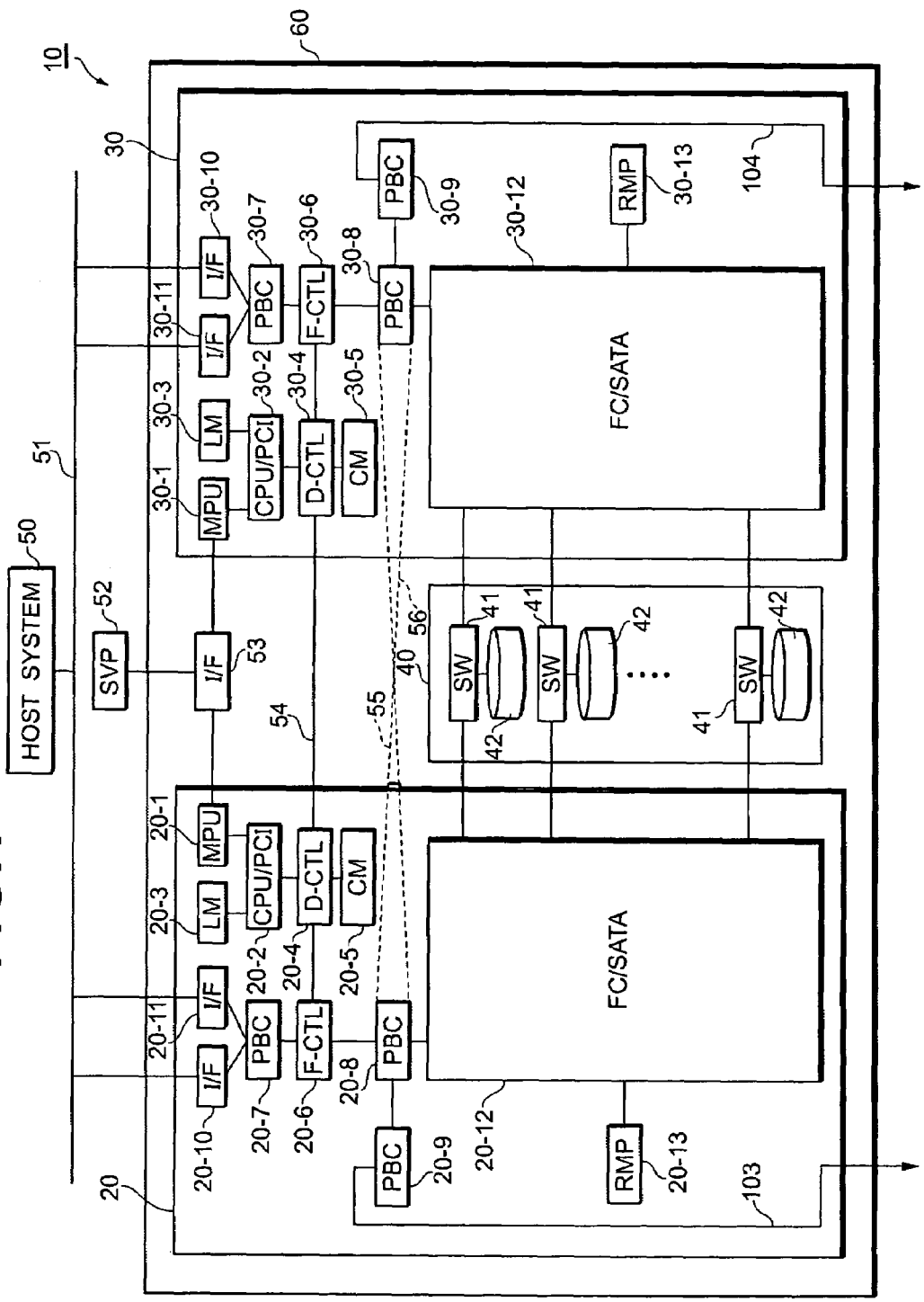
FIG. 1 is a diagram showing the configuration of a basic chassis of a storage system according to an embodiment of the present invention.

FIG. 1 shows a configuration of a basic chassis 60 of a storage system 10 according to the embodiment. The storage system 10 is connected to one or more host systems 50 via a communication network 51. The host system 50 is, for example, a business server system, work station, main frame, or personal computer.

Examples of the communication network 51 include a SAN (Storage Area Network), a LAN (Local Area Network), the Internet, a dedicated line, and a public line. When the host system 50 is connected to the storage system 10 via a SAN, the host system 50 requests data input/output in blocks, which are data management units for storage resources in the storage system 10, in accordance with fibre channel protocol. When the host system 50 is connected to the storage system 10 via a LAN, the host system 50 requests data input/output in files designating a file name, in accordance with a protocol such as NFS (Network File System). In order to accept file access requests from the host system 50, it is necessary to provide the storage system 10 with NAS (Network Attached Storage) functions.

The storage system 10 includes duplex controllers 20 and 30, and a plurality of SATA disk drives 42. The controllers 20 and 30 can control the plurality of SATA disk drives 42 at a predefined RAID level (e.g., 0, 1, 5). In RAID, the plurality of SATA disk drives 42 is managed as one RAID group. In the RAID group, a plurality of logical volumes, each constituting a unit of access from the host system 50, is defined. Each logical volume is assigned a LUN (Logical Unit Number).

The controller 20 has an MPU 20-1, a CPU/PCI bridge 20-2, a local memory (LM) 20-3, a data transfer control unit (D-CTL) 20-4, a cache memory (CM) 20-5, an FC controller (F-CTL) 20-6, port bypass circuits (PBC) 20-7, 20-8 and 20-9, host interfaces (I/F) 20-10 and 20-11, an FC/SATA converter 20-12, and a resource management processor (RMP) 20-13 mounted collectively on a single controller board.

The MPU 20-1 controls I/O processing (write access or read access) to or from the plurality of SATA disk drives 42 in response to data input/output requests from the host system 50. The local memory 20-3, in addition to storing various programs for the MPU 20-1, functions as a work area for the MPU 20-1. The CPU/PCI bridge 20-2 interconnects the MPU 20-1, the local memory 20-3, and the data transfer control unit 20-4. The cache memory 20-5 is a buffer memory for temporarily storing data to be written to or read from the SATA disk drives 42. The cache memory 20-5 is provided with a backup power supply, and is configured as nonvolatile memory, preventing cache data loss even when any power failure arises in the storage system 10.

The data transfer control unit 20-4 interconnects the CPU/PCI bridge 20-2, the cache memory 20-5, and the FC controller 20-6, and controls data transfers between the host system 50 and the SATA disk drives 42. More specifically, upon write access from the host system 50, the data transfer control unit 20-4 writes write data (dirty data) received from the host system 50 to the cache memory 20-5. Subsequently, when write data has accumulated in the cache memory 20-5 to some extent, the data transfer control unit 20-4 asynchronously writes the write data to the SATA disk drives 42. Meanwhile, upon read access from the host system 50, the data transfer control unit 20-4 writes read data read from the SATA disk drives 42 to the cache memory 20-5, as well as transferring it to the host system 50.

The host interfaces 20-10 and 20-11 are controllers for controlling interfaces with the host system 50, and having the function of receiving block access requests from the host system 50 according to fibre channel protocol. The FC controller 20-6 is connected to the FC/SATA converter 20-12 via the port bypass circuit 20-8, and also to an FC/SATA converter of an additional chassis via the port bypass circuit 20-8 (see FIG. 2). The FC/SATA converter 20-12 conducts protocol conversion between fibre channel protocol and SATA protocol. The FC/SATA converter 20-12 is connected to a plurality of path switches 41 via a back board 40. The pass switches 41 connect even-numbered SATA disk drives 42 and the FC/SATA converter 20-12 in a point-to-point manner.

The resource management processor 20-13 monitors and controls basic chassis resources (e.g., the controller 20, a UPS power supply, a battery, a fan unit, a panel switch, a MOS switch, a voltage monitor, a panel LED and a warning LED). For example, it can perform voltage monitoring of the system using the voltage monitor to detect any voltage abnormality, and temperature monitoring of the controller 20 to detect any temperature abnormality; or it can control the MOS switch, turning on/off of a main power supply and a standby power supply; the number of rotations of the fan unit, adjusting the system temperature; or blinking of the panel LED or the warning LED; or it can monitor the battery status, and can also perform reset control of the FC/SATA converter 20-12 (as described in detail later).

The MPU 20-1 transmits an SES (SCSI Enclosure Services) command to the FC/SATA converter 20-12 via an I2C communication interface (not shown) to access the resource management processor 20-13, thereby acquiring the basic chassis resource monitoring information from the resource management processor 20-13.

The controller 30 has an MPU 30-1, a CPU/PCI bridge 30-2, a local memory (LM) 30-3, data transfer control unit (D-CTL) 30-4, a cache memory (CM) 30-5, an FC controller (F-CTL) 30-6, port bypass circuits (PBC) 30-7, 30-8 and 30-9, host interfaces (I/F) 30-10 and 30-11, an FC/SATA converter 30-12, and a resource management processor (RMP) 30-13 mounted collectively on a single controller board. The FC/SATA converter 30-12 is connected to the plurality of path switches 41 via the back board 40. The path switches 41 interconnect odd-numbered SATA disk drives 42 and the FC/SATA converter 30-12 with a loop. The description of the controller 30 configuration is omitted since it is the same as that of the controller 20.

The data transfer control units 20-4 and 30-4 of the controllers 20 and 30 are interconnected via a data bus 54 and control data transfers so that identical data is doubled in the two cache memories 20-5 and 30-5. Furthermore, when the SATA disk drives 42 are managed at the RAID level of 5, the data transfer control units 20-4 and 30-4 calculate parity data.

The port bypass circuits 20-8 and 30-8 are interconnected with two alternate paths 55 and 56, and upon occurrence of any failure in either controller 20 (or 30), can fail over to the other controller 30 (or 20).

The storage system 10 is connected to a management terminal (SVP) 52 for maintaining or managing the system. The storage system 10 includes a communication interface 53 for conducting data communication with the management terminal 52. If the data communication protocol between the storage system 10 and the management terminal 52 is fibre channel protocol, a GBIC module and a fibre channel protocol controller may be mounted on the communication interface 53. If the data communication protocol between them is TCP/IP, a LAN port connector, and an LSI for TCP/IP control may be mounted on the communication interface 53. An operator uses the management terminal 52 to perform, for example, the setting of a logical volume defined in the SATA disk drives 42, the addition or removal of a SATA disk drive 42 and the changing of the RAID configuration setting (e.g., change of the RAID level from 5 to 1). Furthermore, firmware for the FC/SATA converters 20-12 and 30-12 can be downloaded from the management terminal 52 to the MPUs 20-1 and 30-1 of the controllers 20 and 30 (as described in detail later). Also, the management terminal 52 may be built in the storage system 10, or may be external.

Figure 2:
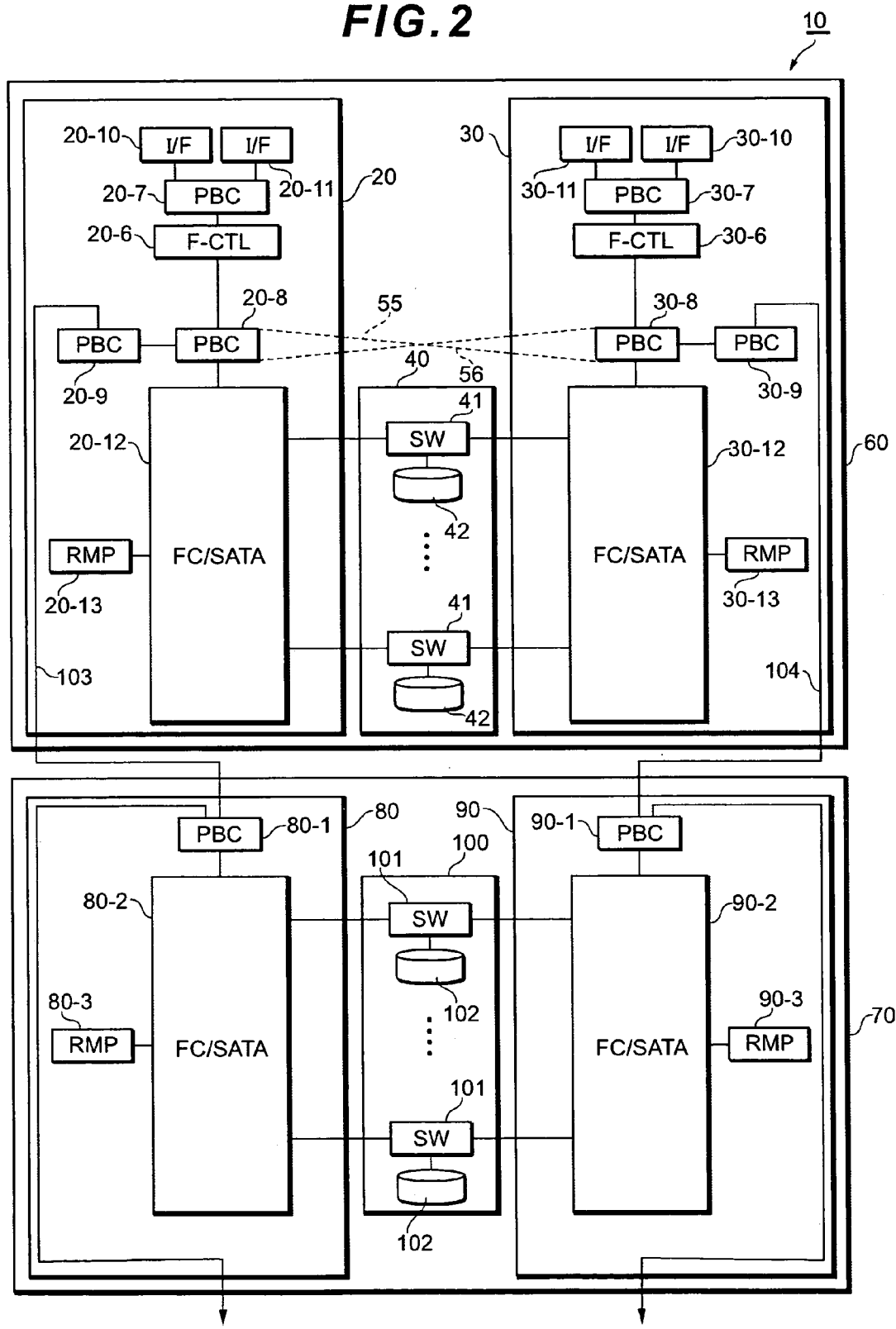
FIG. 2 is a diagram showing the configuration of a basic chassis and additional chassis of the storage system according to an embodiment of the present invention.

FIG. 2 shows the configuration of a basic chassis 60 and an additional chassis 70 in the storage system 10 according to the embodiment. The storage system 10 can extend its storage capacity by adding an additional chassis 70 to the basic chassis 60.

The additional chassis 70 includes duplex controllers 80 and 90, and a plurality of SATA disk drives 102. The controllers 80 and 90 can control the plurality of SATA disk drives 102 at a predefined RAID level (e.g., 0, 1, or 5). In RAID, the plurality of SATA disk drives 102 is managed as one RAID group. In the RAID group, a plurality of logical volumes, each constituting a unit of access from the host system 50, is defined. Each logical volume is assigned a LUN (Logical Unit Number).

The controller 80 includes a port bypass circuit (PBC) 80-1, an FC/SATA converter 80-2, and a resource management processor (RMP) 80-3. The FC/SATA converter 80-2 is connected to a plurality of path switches 101 via a back board 100. The path switches 101 connect even-numbered SATA disk drives 102 and the FC/SATA converters 80-2 in a point-to-point manner.

The controller 90 includes a port bypass circuit (PBC) 90-1, an FC/SATA converter 90-2, and a resource management processor (RMP) 90-3. The FC/SATA converter 90-2 is connected to the plurality of path switches 101 via the back board 100. The path switches 101 connect odd-numbered SATA disk drives 102 and the FC/SATA converter 80-2 in a point-to-point manner.

The port bypass circuits 80-1 and 90-1 of the additional chassis 70 are connected to the port bypass circuits 20-9 and 30-9 of the basic chassis 60 via FC paths 103 and 104, respectively. This configuration enables the controllers 20 and 30 of the basic chassis 60 to access the SATA disk drives 102 of the additional chassis 70.

Figure 3:
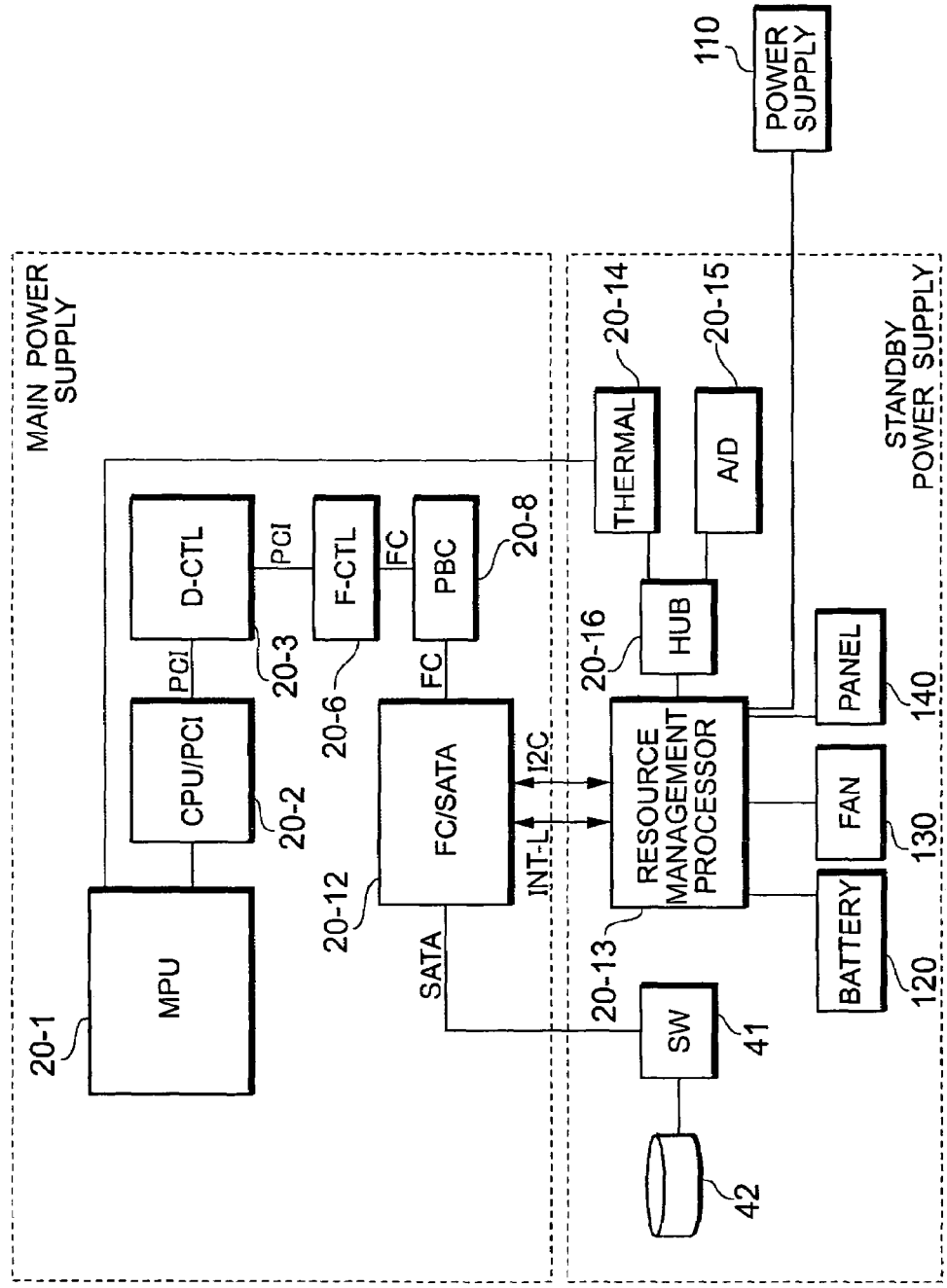
FIG. 3 is an explanatory diagram of power supply boundaries in a controller.

FIG. 3 shows power supply boundaries in the controller 20. The detailed description of the devices indicated by the reference numerals used in FIG. 1 is omitted as they represent the same devices as shown in FIG. 1. This embodiment has a dual power supply system, i.e., a main power supply and a standby power supply.

The main power supply is a power supply channel for supplying the power necessary for the system in an operational state. Examples of the devices powered by the main power supply are the MPU 20-1, the CPU/PCI bridge 20-2, the data transfer control unit 20-4, the FC controller 20-6, the port bypass circuit 20-8, and the FC/SATA converter 20-12. Devices consuming a large amount of power are selected as devices to be powered by the main power supply.

The standby power supply is a power supply channel for supplying the minimum power necessary for the system in a standby state. Examples of the devices powered by the standby power supply are the resource management processor 20-13, the temperature detection device 20-14, the A/D converter 20-15, the hub 20-16, the path switches 41, the SATA disk drives 42, and a fan unit 130. The temperature detection device 20-14 is a device for detecting the temperature of the MPU 20-1. The A/D converter 20-15 converts analog information, such as a voltage or a temperature, into digital data. The resource management processor 20-13 is connected with the temperature detection device 20-14 or the A/D converter 20-15 via the hub 20-16 and acquires basic chassis resource information. The resource management processor 20-13 is powered by the standby power supply as it needs to monitor the power resources of the basic chassis 60 even during standby, and also control the on/off state of the main power supply. The fan unit 130 is a device for performing forced air cooling inside the basic body 60. The fan unit 130 may perform forced air cooling of the battery 120 even during standby, so it is preferable to have it powered by the standby power supply. An iSCSI host interface (not shown) may be remote-controlled by the host system 50, so it is preferable to have it powered by the standby power supply, too. In this way, the minimum number of devices necessary for keeping the storage system 10 in a standby state are selected as devices to be powered by the standby power supply.

In FIG. 3, a power supply 110 is an uninterruptible power supply unit. The battery 120 supplies backup power to the cache memory 20-5 when the main power supply is off. The panel switch 140 is an operating switch for controlling the on/off state of the main power supply and standby power supply. The controller 30 also has similar power supply boundaries and power supply channels.

Figure 4:
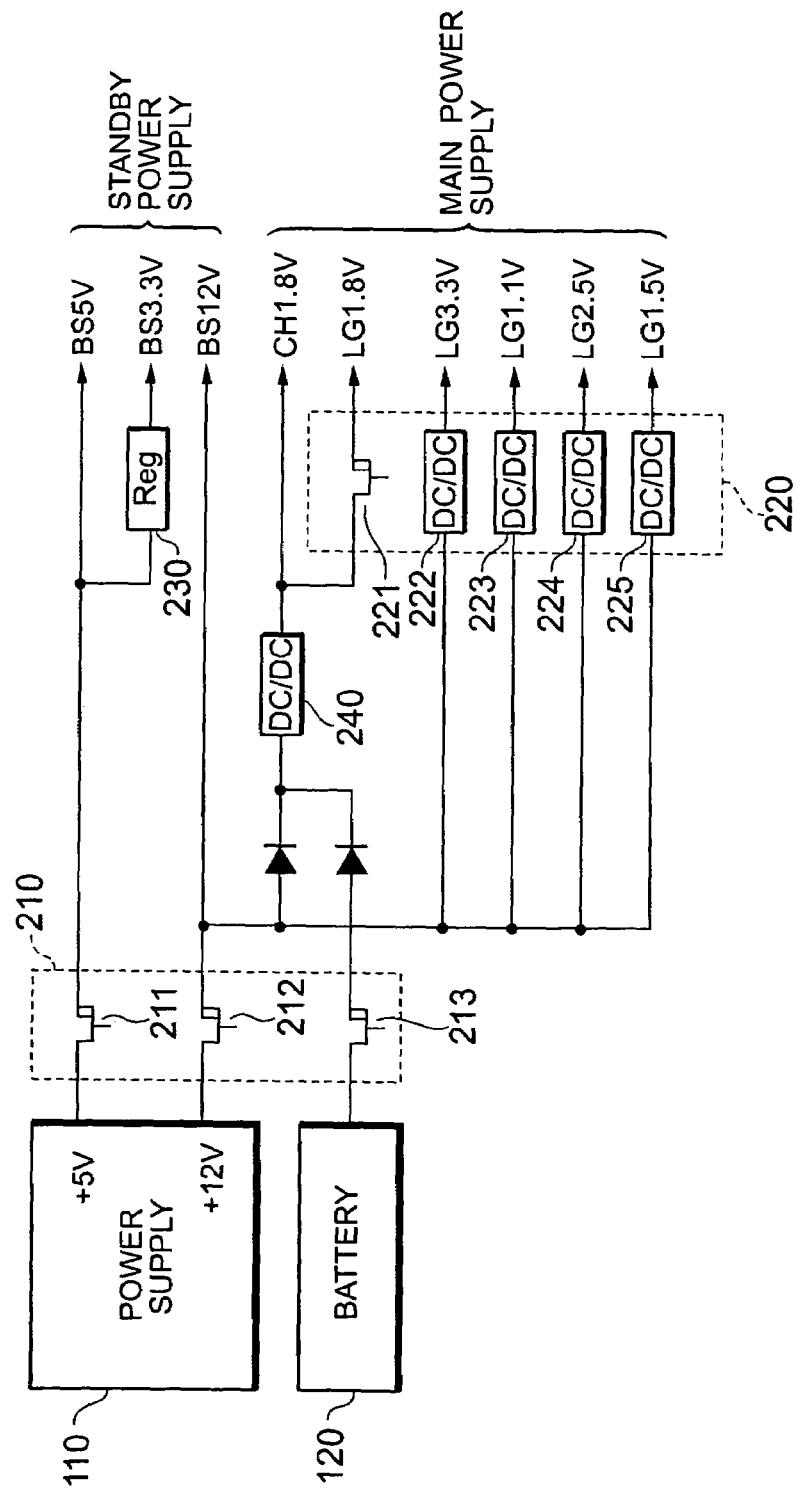
FIG. 4 is an explanatory diagram of a power supply system of a main power supply and a standby power supply.

FIG. 4 shows the power supply system of the main power supply and the standby power supply.

The power supply 110 has a 12V power supply and a 5V power supply. In this embodiment, a power supply system that branches into two power supply channels from the power supply 110 is provided, and the on/off state of the main power supply and the standby power supply is controlled by switching devices 210 and 220. This configuration eliminates the need to provide a UPS power supply to each power supply channel, and therefore can achieve a reduction in cost.

The switching device 210 has a plurality of MOS switches 211, 212 and 213. The resource management processor 20-13 controls the on/off state of the standby power supply by controlling the on/off state of the plurality of MOS switches 211, 212 and 213. The 5V line of the power supply 110 is used as a control line (BS5V line) for the fan unit 130 in a standby state. Furthermore, the BS5V line is maintained at 3.3V by a regulator 230, and used as a power supply line (BS3.3V line) for the resource management processor 20-13 and its peripheral TTL circuit or others. The 12V line of the power supply 110 is used as a power supply line (BS12V line) for the iSCSI host interface in a standby state. The BS 5V line, BS3.3V line, and BS12V line are standby power supply channels.

The 12V line of the power supply 110 branches into a plurality of power lines. One of them is maintained at 1.8V by a DC/DC converter 240, and is used as a power supply line (CH1.8V line) supplying power to the cache memory 20-5. The cache memory 20-5 is powered by the battery 120 when the main power supply is off. A branch power supply line branches from the CH1.8V line. This branch power supply line is a power supply line (LG1.8V line) supplying power to a core circuit of the FC/SATA converter 20-12, and a core circuit of the FC controller 20-6. The LG1.8V line is provided with a MOS switch 221 so that power from the battery 120 is not supplied to the core circuit of the FC/SATA converter 20-12 when the main power supply is off. When the main power supply is off, there is no need for the FC/SATA converter 20-12 to operate, and it is only necessary for the cache memory 20-5 to be supplied with backup power. Therefore, wasteful power consumption of the battery 120 can be avoided by the MOS switch 221 being turned off.

The other power lines among the plurality of power lines that branch from the 12V line of the power supply 110 are used as a 3.3V power supply line (LG3.3V line), a 1.1 power supply line (LG1.1V line), a 2.5V power supply line (LG2.5V line), and a 1.5V power supply line (LG1.5V line) by DC/DC converters 222, 223, 224 and 225. The LG3.3V line supplies power to, for example, an I/O circuit in the FC/SATA converter 20-12, an I/O circuit in the FC controller 20-6 and an I/O circuit in the CPU/PCI bridge 20-2. The LG1.1V line supplies power to, for example, a core circuit of the MPU 20-1. The LG2.5V line supplies power to, for example, an I/O circuit in the MPU 20-1, and an I/O circuit in the FC controller 30-6. The LG1.5V line supplies power to, for example, a core circuit of the data transfer control unit 20-4 and a core circuit of the CPU/PCI bridge 20-2. The CH1.8V line, the LG1.8V line, the LG3.3V line, the LG1.1V line, the LG2.5V line, and the LG1.5V line are main power supply channels.

The core circuit of the FC/SATA converter 20-12 consumes a large amount of power, so it is difficult for the FC/SATA converter 20-12 to be supplied with the necessary power by a regulator. Therefore, in order to configure the FC/SATA converter 20-12 to be powered by the standby power supply, another DC/DC converter must be provided to the standby power supply channel. Since a DC/DC converter is a device that is more expensive than a regulator, the above configuration will increase the cost of manufacturing the storage system 10. Therefore, in order to supply necessary and sufficient power to the core circuit of the FC/SATA converter 20-12 while lowering the manufacturing cost of the storage system 10, power may be supplied from the main power supply channel with the plurality of DC/DC converters provided, to the FC/SATA converter 20-12.

Figure 5:
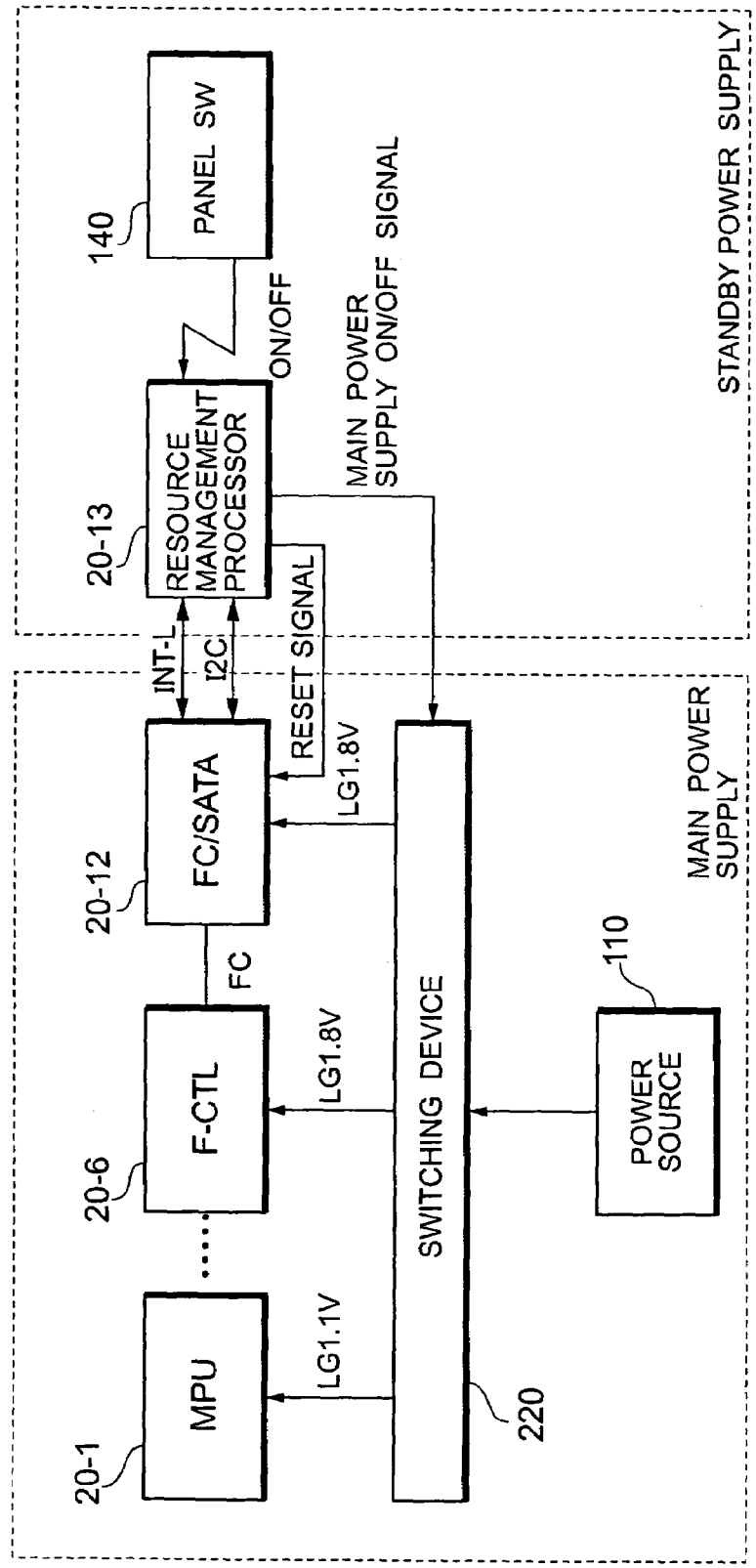
FIG. 5 is a block diagram of the main devices respectively arranged in the main power supply region and the standby power supply region.

FIG. 5 shows the main devices respectively arranged in the main power supply and the standby power supply.

Upon the installation of new firmware, or immediately after power from the main power supply is applied, it is necessary to perform a hard reset of the FC/SATA converter 20-12 in order to reboot it. In conventional additional chassis, an FC/SATA converter and a resource management processor are mounted on an identical controller board, and are configured so that when the FC/SATA converter is reset, the resource management processor is also reset. Since the FC/SATA converter and the resource management processor both execute a program from the top, no problem will arise even when both are reset. However, in this embodiment, the resource management processor 20-13 controls the on/off state of power supply from the main power supply to the MPU 20-1. Thus, if the resource management processor 20-13 is reset simultaneously in order to reset the FC/SATA converter 20-12, the power supply from the main power supply to the MPU 20-1 will also be reset, resulting in the MPU 20-1 being rebooted. Therefore, this embodiment has adopted a configuration in which another dedicated signal line INT_L for reset processing is provided between the resource management processor 20-13 and the FC/SATA converter 20-12 in order to reset only the FC/SATA converter 20-12.

Figure 6:
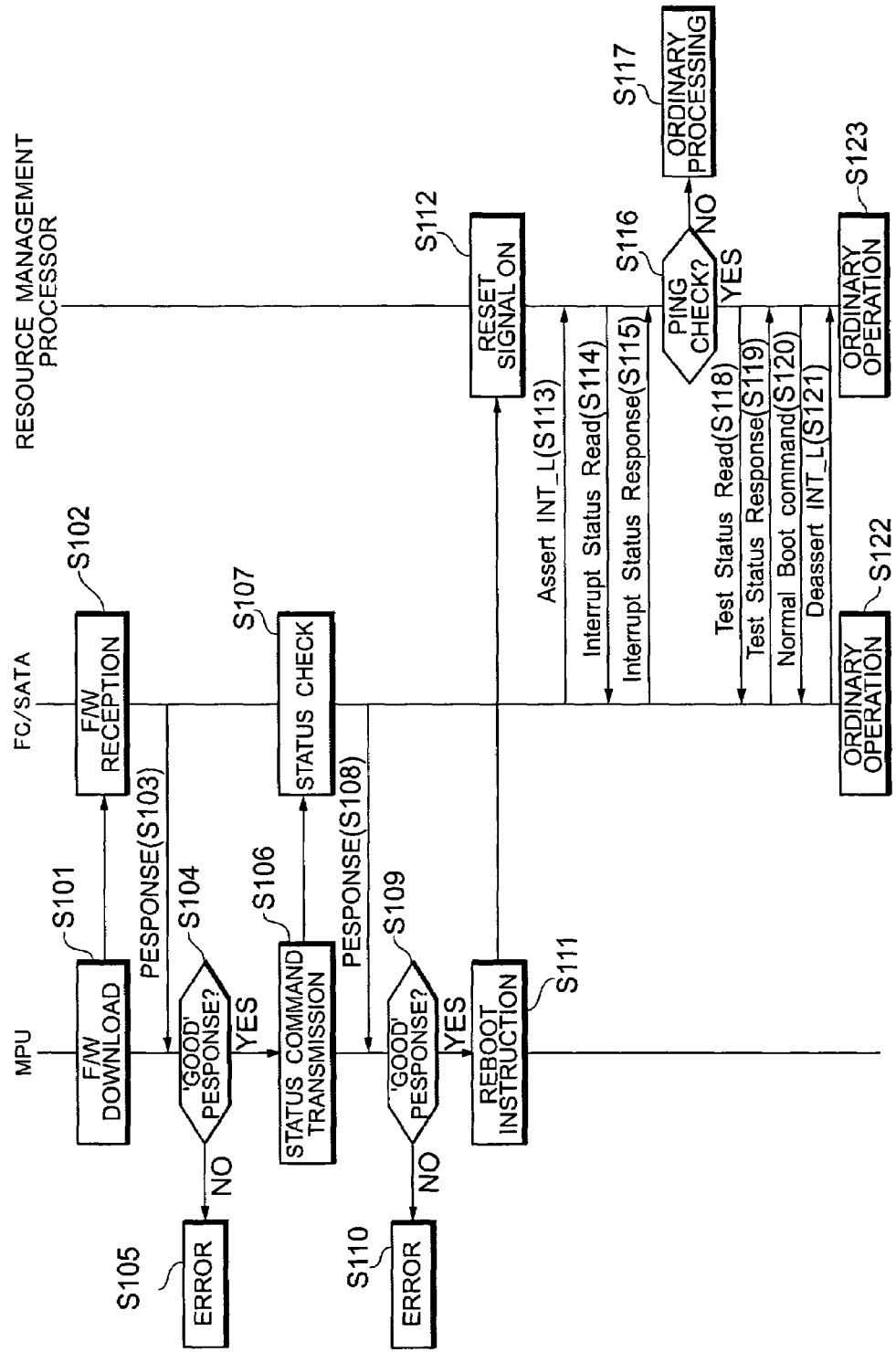
FIG. 6 is a diagram indicating a sequence for resetting an FC/SATA converter when firmware is downloaded.

FIG. 6 shows a sequence for resetting the FC/SATA converter when firmware is downloaded.

The MPU 20-1, upon FC/SATA converter firmware being downloaded from a device such as the management terminal 52 (S101), sends the firmware to the FC/SATA converter 20-12 (S102). Then, the FC/SATA converter 20-12 gives a response to the MPU 20-1 (S103).

If the response from the FC/SATA converter 20-12 is "Good" (S104: YES), the MPU 20-1 sends a status command to the FC/SATA converter 20-12 (S106). A status command is a command to request a check of the downloaded firmware. Meanwhile, if the response from the FC/SATA converter 20-12 is not "Good" (S104: NO), The MPU 20-1 performs error processing (S105).

The FC/SATA converter 20-12, upon receipt of the status command, checks the firmware (S107), and gives a response back to the MPU 20-1 (S108). If the response from the FC/SATA converter 20-12 is "Good" (S109: YES), the MPU 20-1 sends a reboot command to the resource management processor 20-13 (S111). A reboot command is a command to direct rebooting of the FC/SATA converter 20-12. Meanwhile, if the response from the FC/SATA converter 20-12 is not "Good" (S109: NO), the MPU 20-1 performs error processing (S110).

The resource management processor 20-13, upon receipt of the reboot command, turns on a reset signal for the FC/SATA converter 20-12 (S112). Then, commands are transmitted between the FC/SATA converter 20-12 and the resource management processor 20-13 via the signal line INT_L, and the FC/SATA converter 20-12 and the resource management processor 20-13 mutually check each other's operating status (S113-S121).

First, the FC/SATA converter 20-12 instructs the resource management processor 20-13 to obtain information stored in a register for controlling the FC/SATA converter 20-12 (S113). When the resource management processor 20-13 requests information from the control register (S114), the FC/SATA converter 20-12 sends information stored in the control register (S115). The resource management processor 20-13 refers to the received information to determine whether a ping check should be conducted (S116). A ping check refers to mutual checking of each other's normal operation (more specifically, mutual checking of each other's normal boot).

If a ping check is necessary (S116: YES), the resource management processor 20-13 requests information stored in a test register of the FC/SATA converter 20-12 (S118). Then, the FC/SATA converter 20-12 sends the information stored in the test register of the FC/SATA converter 20-12 to the resource management processor 20-13 (S119). If the information stored in the test register is sent normally, the resource management processor 20-13 determines that the FC/SATA converter 20-12 is operating normally.

Next, the resource management processor 20-13 sends a reboot command to the FC/SATA converter 20-12 (S120). The FC/SATA converter 20-12, upon receipt of the reboot command, reboots, and ends the process of communication with the resource management processor 20-13 (S121). Subsequently, the FC/SATA converter 20-12 and the resource management processor 20-13 perform their respective normal operations. (S122, S123).

Figure 7:
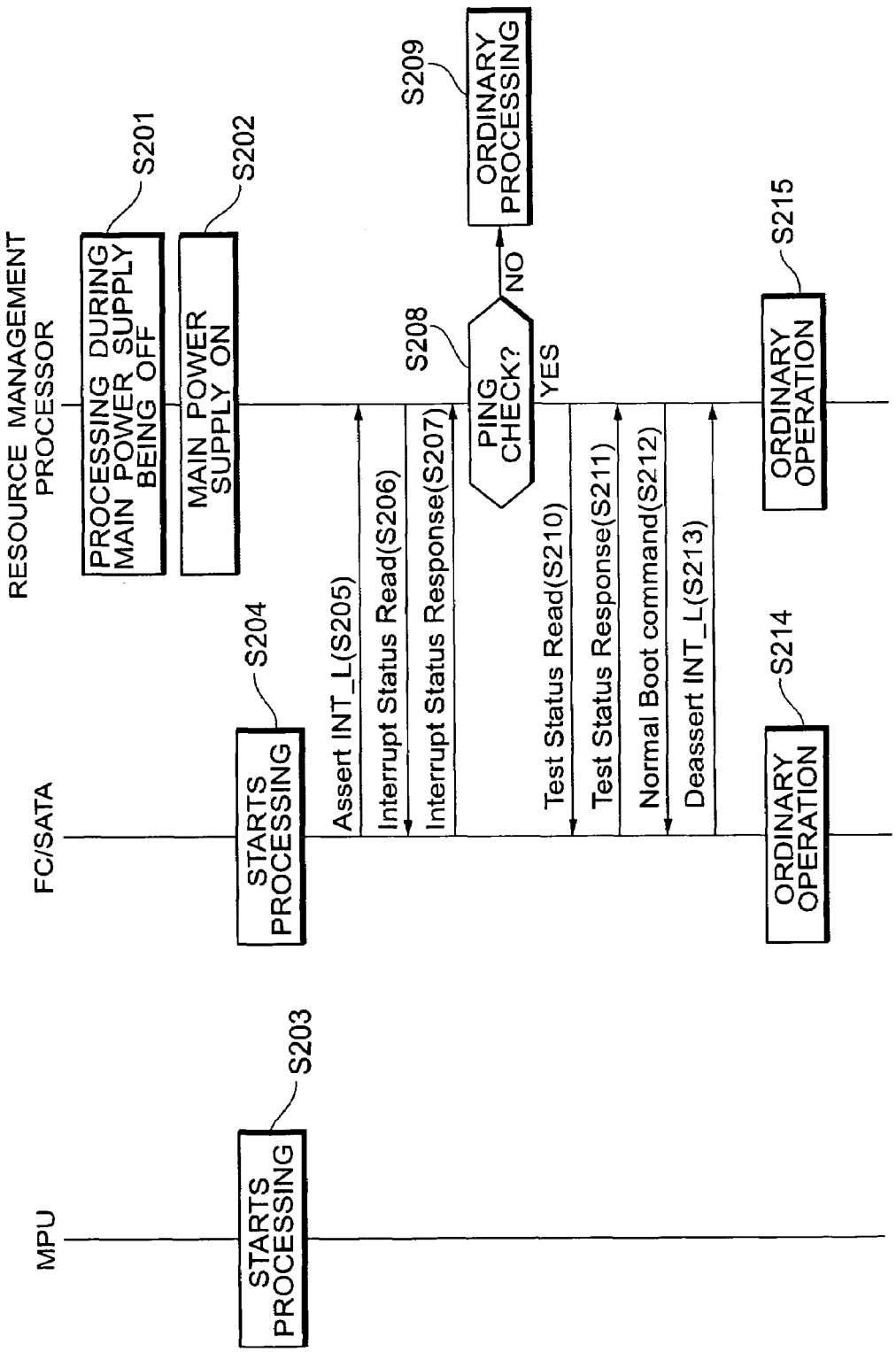
FIG. 7 is a diagram indicating a sequence for resetting an FC/SATA converter immediately after power from the main power supply is applied.
Figure 8:
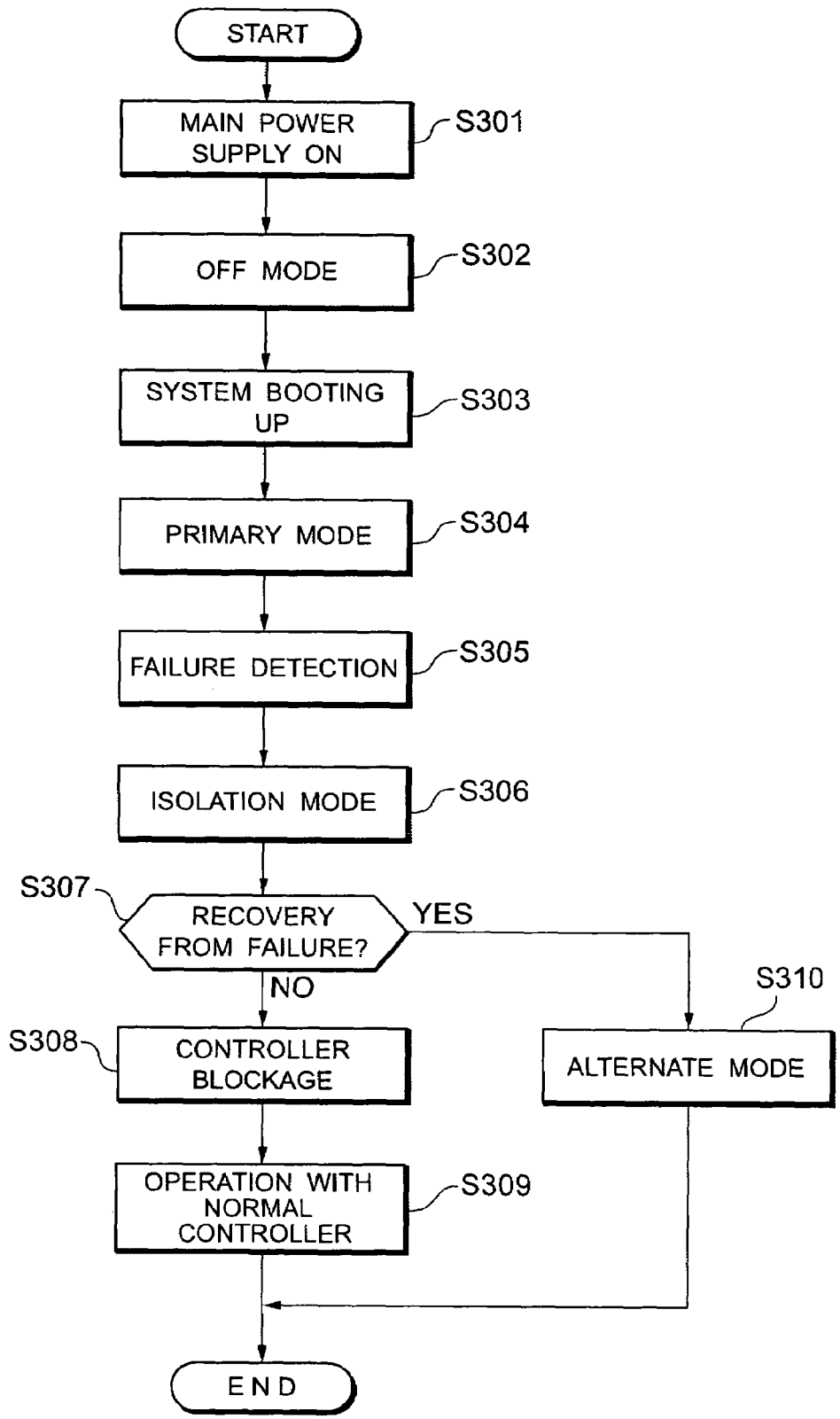
FIG. 8 is a flowchart for, upon occurrence of a failure in an FC loop, isolating the failure.

FIG. 7 shows a sequence for resetting the FC/SATA converter 20-12 immediately after power is applied from the main power supply.

Until power is applied from the main power supply, the resource management processor 20-13 operates with power from the standby power supply and monitors the basic chassis resources (S201). When an operator instructs the application of power from the main power supply by using the operation panel 140, the resource management processor 20-13 turns on the main power supply via the switching device 220 (S202). Then, the MPU20-1 and the FC/SATA converter 20-12 start their respective operations (S203, S204). The detailed description of the subsequent processing (S205-S215) is omitted as it is the same as that of S113-S123.

According to this embodiment, the dedicated signal line INT_L for reset processing is provided separately from the I2C interface for sending and receiving the basic chassis resource monitoring information, which makes it possible for the FC/SATA converter 20-12 and the resource management processor 20-13 to mutually confirm each other's operating status via the signal line INT_L. Furthermore, when the FC/SATA converter 20-12 and the resource management processor 20-13 mutually determine that each is operating normally, resetting of only the FC/SATA converter 20-12 via the signal line INT_L makes rebooting of only the FC/SATA converter 20-12 without rebooting the MPU20-1 possible.

Next, failure isolation upon occurrence of a failure in an FC loop is explained below, mainly with reference to FIG. 8 and FIG. 9A to FIG. 9F, and also in consideration of the system configuration shown in FIG. 2.

Figure 9A:
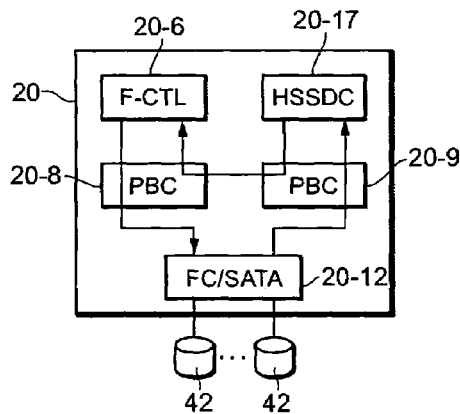
FIG. 9A to FIG. 9F are explanatory diagrams showing each operation mode of a controller in the basic chassis according to an embodiment of the present invention.
Figure 9D:
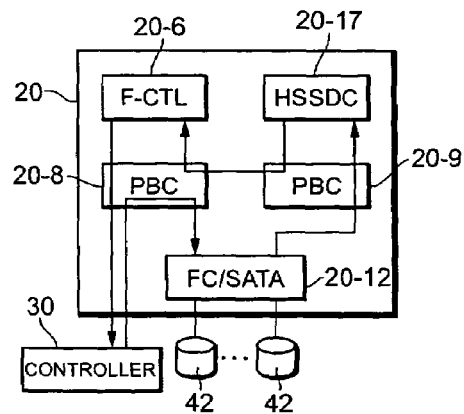
Figure 9B:
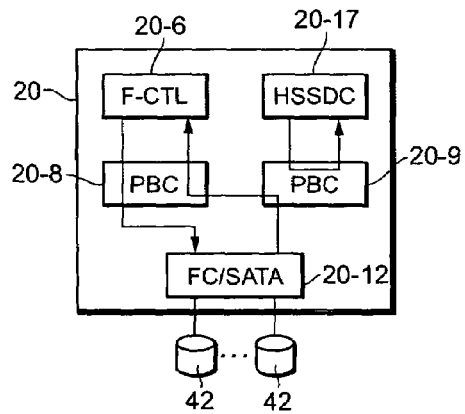

When the main power supply is turned on (S301), the controllers 20 and 30 automatically move to off mode (S302), and subsequently boot up the system (S303). Off mode refers to the mode in which an FC loop is not formed, as shown in FIG. 9F.

When the system is booted up, the controllers 20 and 30 move to primary mode (S304). Primary mode is the mode in which an FC loop is formed from the FC controller 20-6 to the controller 80 of the additional chassis 70 (not shown) via the port bypass circuit 20-8, the FC/SATA converter 20-12, the port bypass circuit 20-9 and the HSSDC (High Speed Serial Data Connector) 20-17 of the controller 20 in the basic chassis 60, and also from the controller 80 back to the FC controller 20-6 via the HSSDC 20-17, and the port bypass circuits 20-9 and 20-8. In primary mode, the FC loop operates normally.

When any failure occurs in the FC loop (S305), the controllers 20 and 30 in the basic chassis 60 move to isolation mode (S306), and disconnect the connection between the basic chassis 60 and the additional chassis 70. Isolation mode, as shown in FIG. 9B, is the mode in which an FC loop is completed only within the basic chassis 60.

If the FC loop is not recovered from the failure even after moving to isolation mode (S307: NO), the failure can be considered as being present in the FC loop within the basic chassis 60. Supposing that the failure is present in the controller 20, the controller 20 is blocked (S308), and the normal controller 30 operates to manage the system (S309). Preferably, the management terminal 52, upon the failure being present in the FC loop within the basic chassis 60, displays the occurrence of the failure on its display screen to get the system administrator to change the relevant component.

Figure 9E:
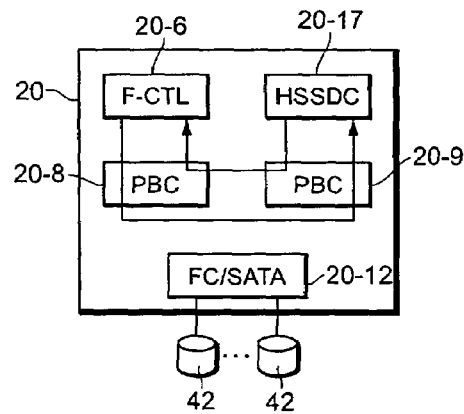

However, when the failure is present in the FC loop within the basic chassis 60, a mode to discontinue the loop connection between the FC controller 20-6 and the FC/SATA converter 20-12, as shown in FIG. 9E, can be logically contemplated, but is not adopted in reality. This is because if this mode is applied when any of the plurality of SATA disk drives 42 in the basic chassis 60 is used as a system drive, the controllers 20 and 30 cannot access the system drive, disabling the operation of the storage system 10 itself. However, when the FC loop failure occurs in the controller 80 of the additional chassis 70, the loop connection between the FC controller 20-6 and the FC/SATA converter 80-2 may be disconnected.

Meanwhile, if the FC loop is recovered from the failure by moving to isolation mode (S307: YES), the failure can be considered as being present in the FC loop in the additional chassis 70. Therefore, the controllers 20 and 30 move to alternate mode (S310). Alternate mode is the mode in which an FC loop is formed as shown in FIG. 9C or FIG. 9D.

Figure 9C:
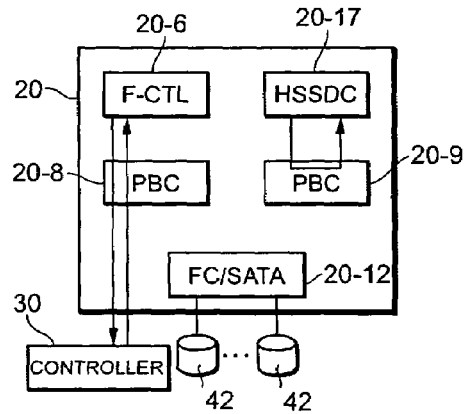
Figure 9F:
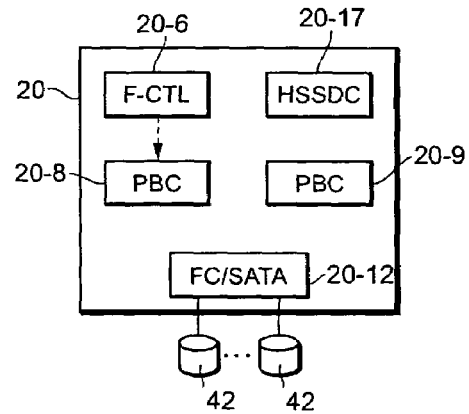

FIG. 9C shows a mode in which, upon occurrence of a failure in a loop in the controller 80 of the additional chassis 70 connected to the controller 20, the connection between the controller 20 and the additional chassis 70 is cancelled, and the controller 20 is connected to the controller 30 with a loop. The controller 20 connects with the controller 90 of the additional chassis 70, which has no failure, via the controller 30, enabling access to the SATA disk drives 102 in the additional chassis 70.

FIG. 9D shows a mode in which, upon occurrence of a failure in a loop in the controller 90 of the additional chassis 70 connected to the controller 30, the connection between the controller 30 and the additional chassis 70 is cancelled, and the controller 30 is connected to the controller 20 with a loop. The controller 30 connects with the controller 80 of the additional chassis 70, which has no failure, via the controller 20, enabling access to the SATA disk drives 102 in the additional chassis 70.

Figure 10:
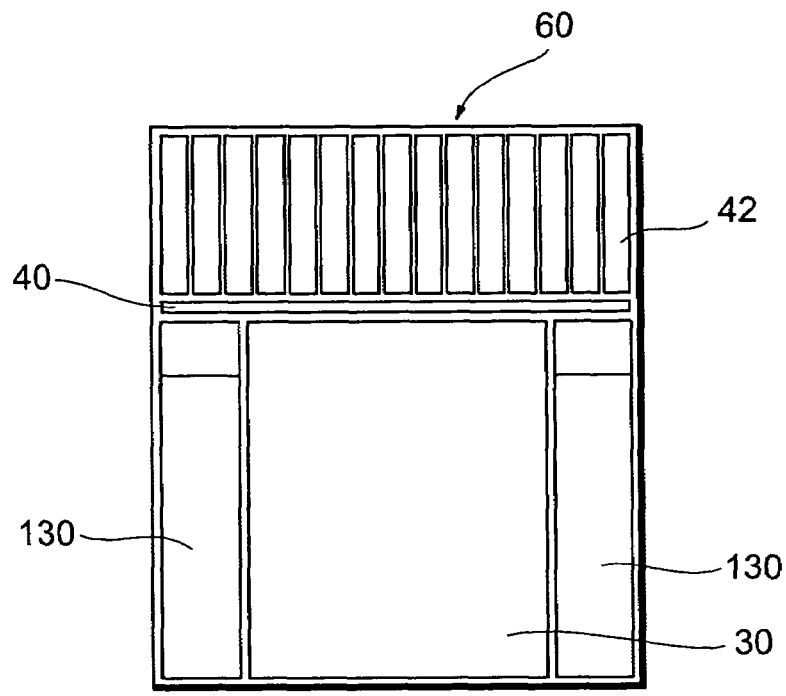
FIG. 10 is a plain view of the basic chassis of the storage system according to an embodiment of the present invention.
Figure 11:
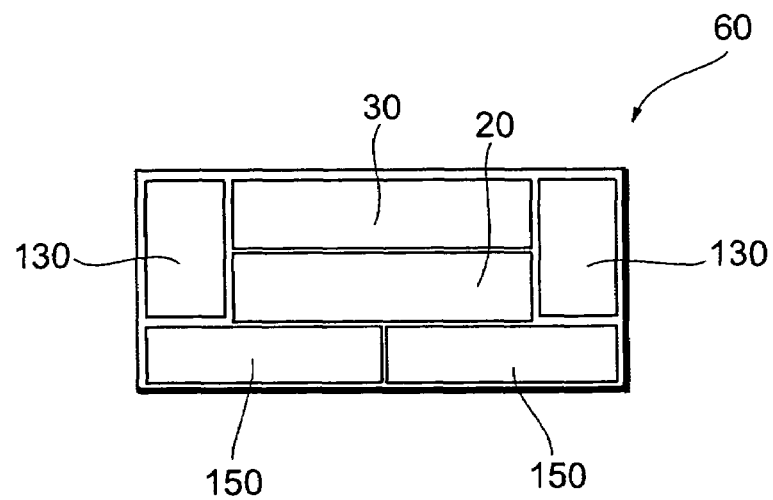
FIG. 11 is a rear view of the basic chassis of the storage system according to an embodiment of the present invention.
Figure 12:
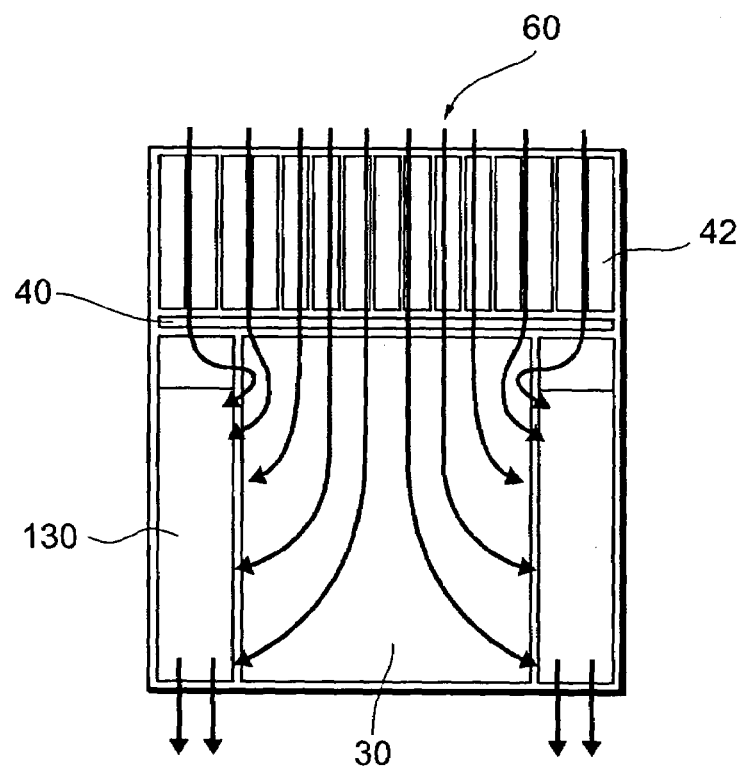
FIG. 12 is a schematic diagram indicating the distribution of air flowing in the storage system according to an embodiment of the present invention.
Figure 13:
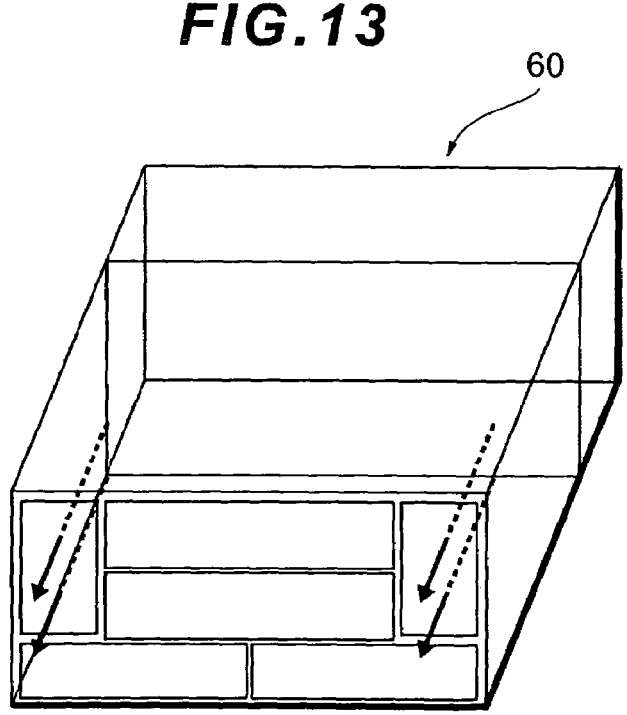
FIG. 13 is a schematic diagram indicating the distribution of air flowing in the storage system according to an embodiment of the present invention.
Figure 14:
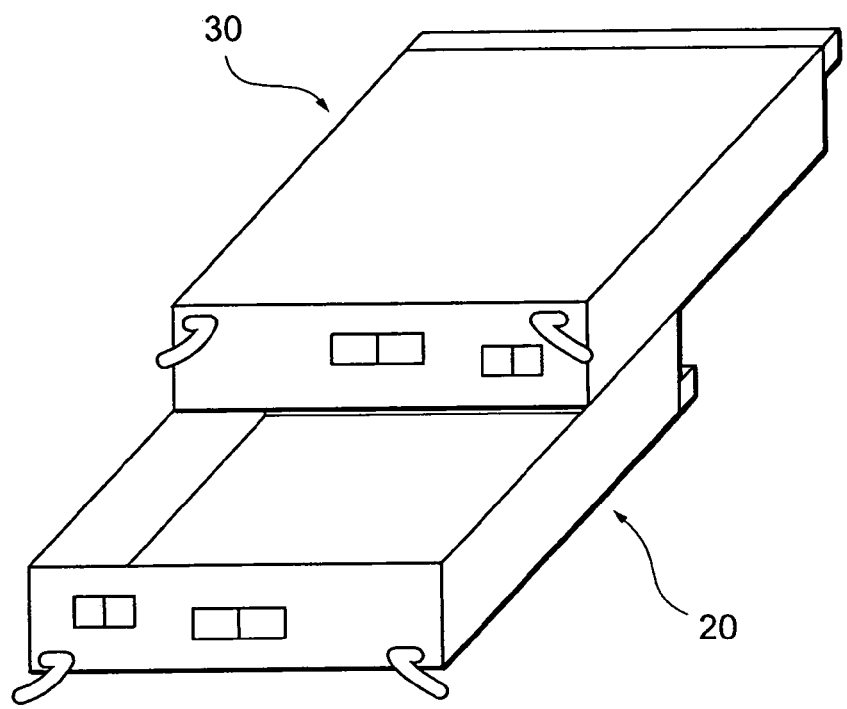
FIG. 14 is a perspective view indicating the arrangement of controllers according to an embodiment of the present invention.
Figure 15:
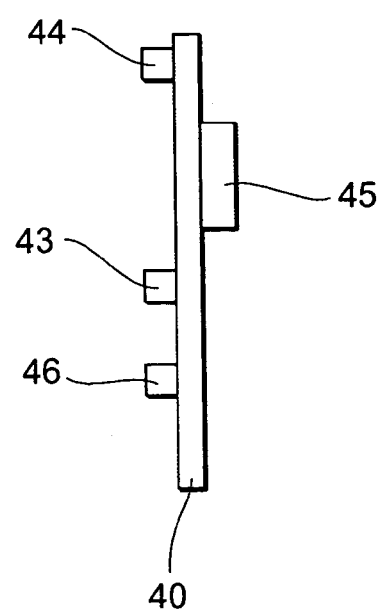
FIG. 15 is a side view of a back board according to an embodiment of the present invention.
Figure 16:
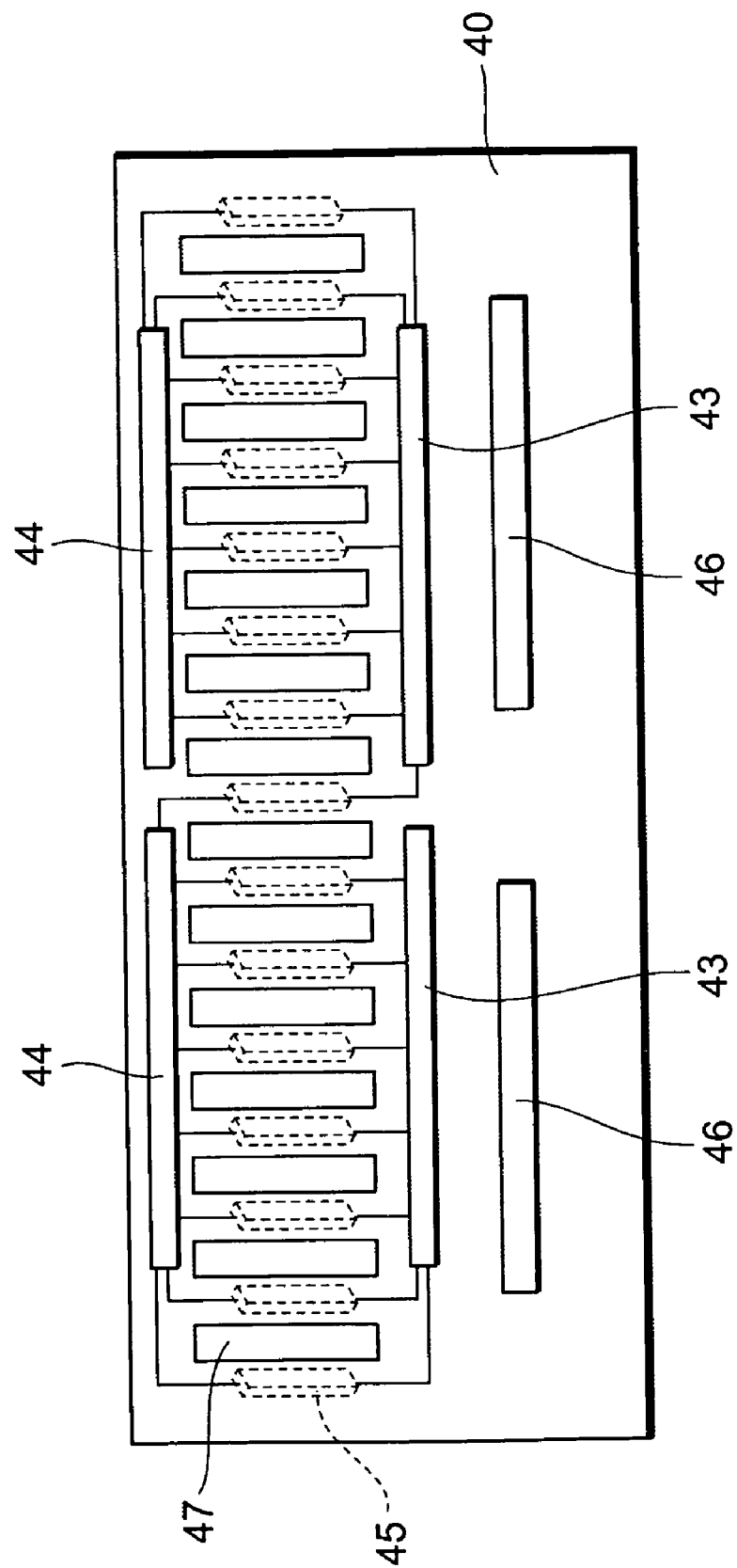
FIG. 16 is a plain view of the back board according to an embodiment of the present invention.

Next, the cooling mechanism of the controllers 20 and 30 of the basic chassis 60 is explained with reference to FIG. 10 to FIG. 19. FIG. 10 is a plain view of the basic chassis 60; FIG. 11 is a rear view of the basic chassis 60; FIG. 12 and FIG. 13 are diagrams indicating the air flow inside the basic chassis 60; FIG. 14 is an explanatory diagram of the arrangement of the controllers 20 and 30; FIG. 15 is a side view of the back board 40; and FIG. 16 is a plain view of the back board 40.

As shown in FIG. 10 and FIG. 11, the plurality of SATA disk drives 42 is arranged in the front portion of the basic chassis 60, and the controllers 20 and 30 are arranged in the rear portion of the basic chassis 60. A logical board in each of the controllers 20 and 30 is connected to the respective SATA disk drives 42 via the back board 40. The controllers 20 and 30 are arranged in two tiers in the basic chassis 60. The fan units 130 are arranged in both side portions of the controllers 20 and 30. Furthermore, power units 150 that accommodate the power supply 110, the battery 120, and others are arranged in the lower portion of the basic chassis 60.

In order to have the controllers 20, 30 in the basic chassis 60, as shown in FIG. 14, they are arranged in such a manner that box opening portions of the controllers 20 and 30 are opposite each other and the controller 30 is reversed upside down. As shown in FIG. 15 and FIG. 16, the back board 40 has connectors 43 for connecting with the controller 20, connectors 44 for connecting with the controller 30, connectors 45 for connecting with the SATA disk drives 42, connectors 46 for connecting with the power units 150, and vent holes 47 for introducing cooling air to the controllers 20 and 30. As shown in FIG. 16, the connectors 43 and 44 for connecting with the controllers 20 and 30 are arranged above and below the connectors 45 respectively, permitting the lengths of the cables for the controllers 20 and 30 to connect with the connector 45 to be substantially equal. This enables enlarging of the vent holes 47 formed by the connector arrangement when the box openings of the controllers 20 and 30 are opposite each other. The vent holes 47 are formed between the connectors 45.

As shown in FIG. 12 and FIG. 13, cooling air, which flows in the gaps between the SATA disk drives 42, and runs through the vent holes 47 of the back board 40, flows in to the cavity between the controllers 20, 30, drawn by the fan units 130, and then forcedly expelled outside the basic chassis 60. As a result of the box openings of the controllers 20 and 30 being opposite each other, a large cavity volume is possible, enhancing the cooling effect.

Figure 17:
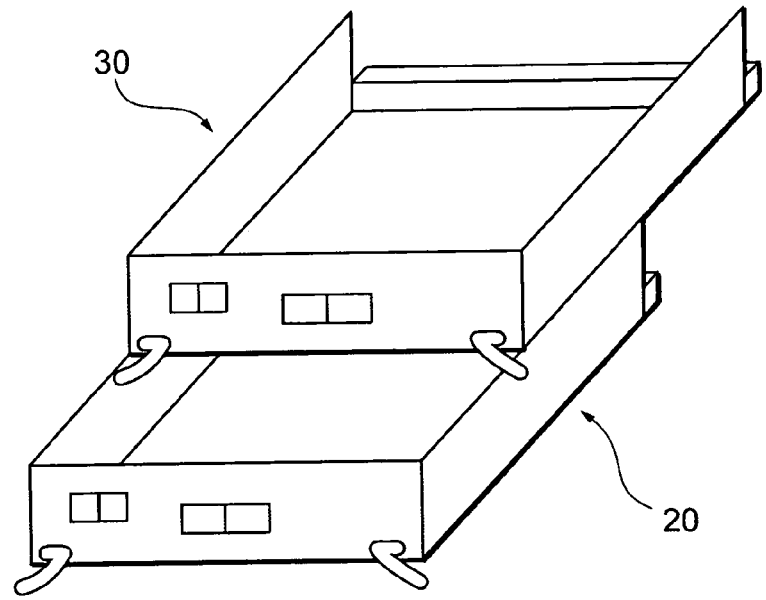
FIG. 17 is a perspective view indicating an arrangement of conventional controllers.
Figure 18:
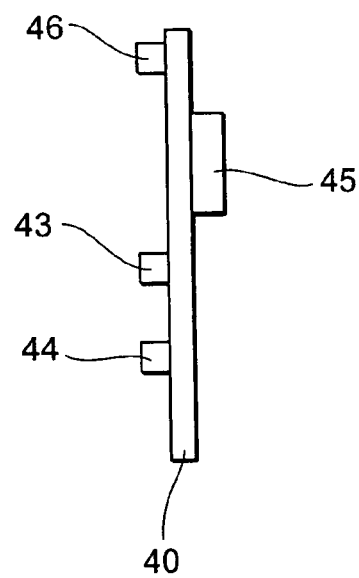
FIG. 18 is a side view of a conventional back board.
Figure 19:
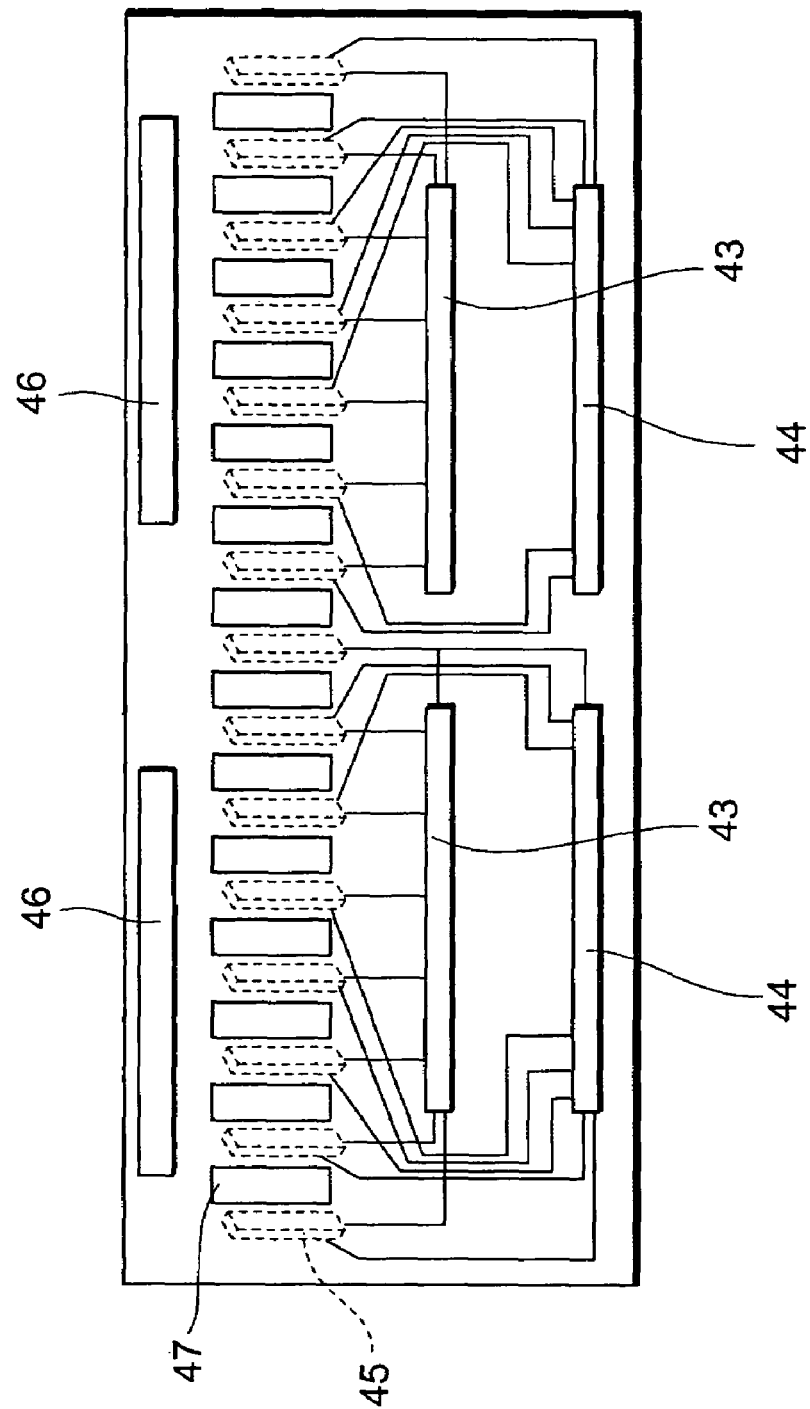
FIG. 19 is a plain view of the conventional back board.

Meanwhile, FIG. 17 to FIG. 19 show the cooling mechanism of conventional controllers 20 and 30. The detailed description of the devices indicated by the reference numerals used in FIG. 10 to FIG. 19 is omitted because they represent the same devices as shown in FIG. 10 to FIG. 19. As shown in FIG. 17, conventionally, the controllers 20 and 30 are arranged in two tiers in the basic chassis 60 so that the bottom face of the controller 30 and the box opening portion of the controller 20 are opposite each other. Accordingly, the volume of the cavity formed between the controllers 20 and 30 is small, making it impossible to obtain a sufficient cooling effect. As shown in FIG. 18 and FIG. 19, cables connected from the connectors 44 to the connectors 45 must be arranged so that they bypass the connectors 43, and the cable lengths become unequal depending on the positions of the connectors 45 to which the connectors 44 are connected, making it impossible to obtain a large cavity between the controllers 20 and 30.

Figure 20:
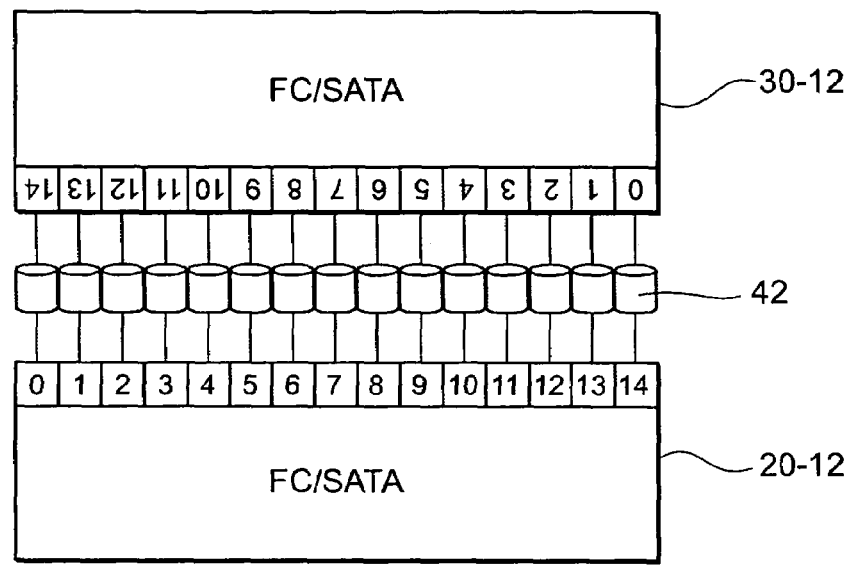
FIG. 20 is a schematic diagram indicating the port arrangement of a reverse-arranged FC/SATA converter.

Next, the port number arrangement of the FC/SATA converters 20-12 and 30-12 is explained. When the controllers 20 and 30 opposite each other are arranged in the basic chassis 60 in such a manner that their respective box openings are opposite each other by reversing the controller 30 upside down, the port number arrangement of the FC/SATA converter 30-12 in the controller 30 is reversed as shown in FIG. 20. Since disk management can be made easier by connecting ports with the same number to an identical SATA disk drive 42, the reversal of the port number arrangement caused by the reverse arrangement of the controller 30 is adjusted for this embodiment.

Figure 21:
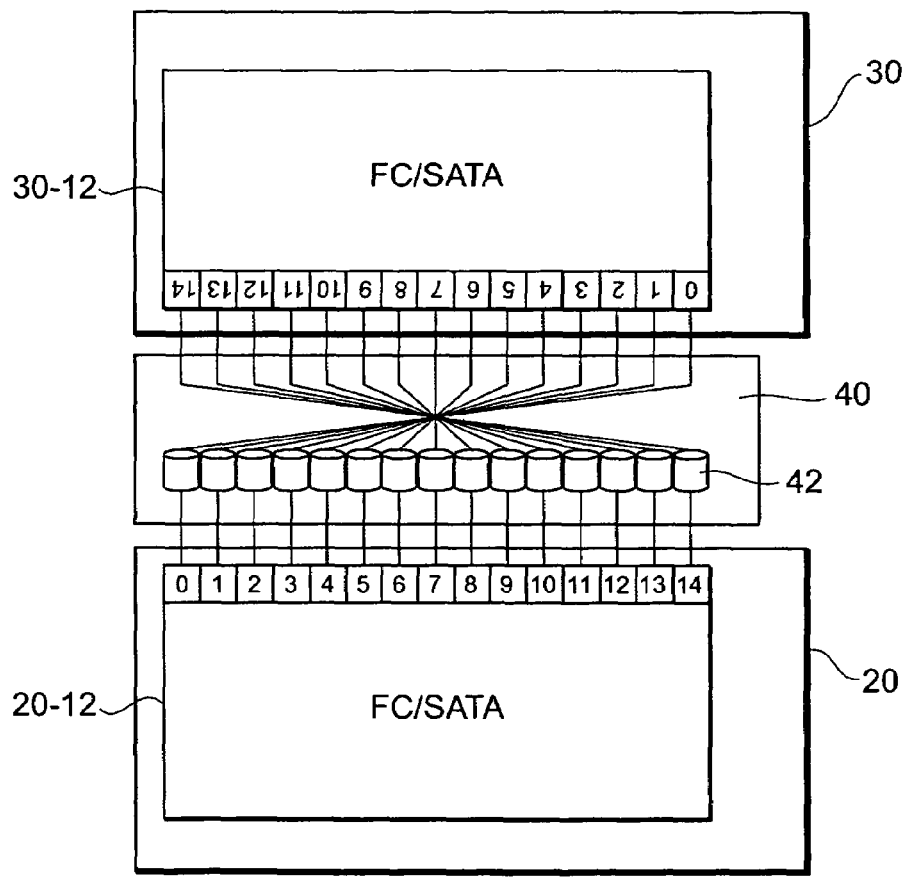
FIG. 21 is a schematic diagram indicating the manner in which the port arrangement of the reverse-arranged FC/SATA converter is reversed by back board wirings.

For example, as a method of adjusting for the port number arrangement reversal, as shown in FIG. 21, wirings 48 of the back board 40 may be re-arranged so that the ports with the same port number in the FC/SATA converters 20-12 and 30-12 are connected to an identical SATA disk drive 42.

Figure 22:
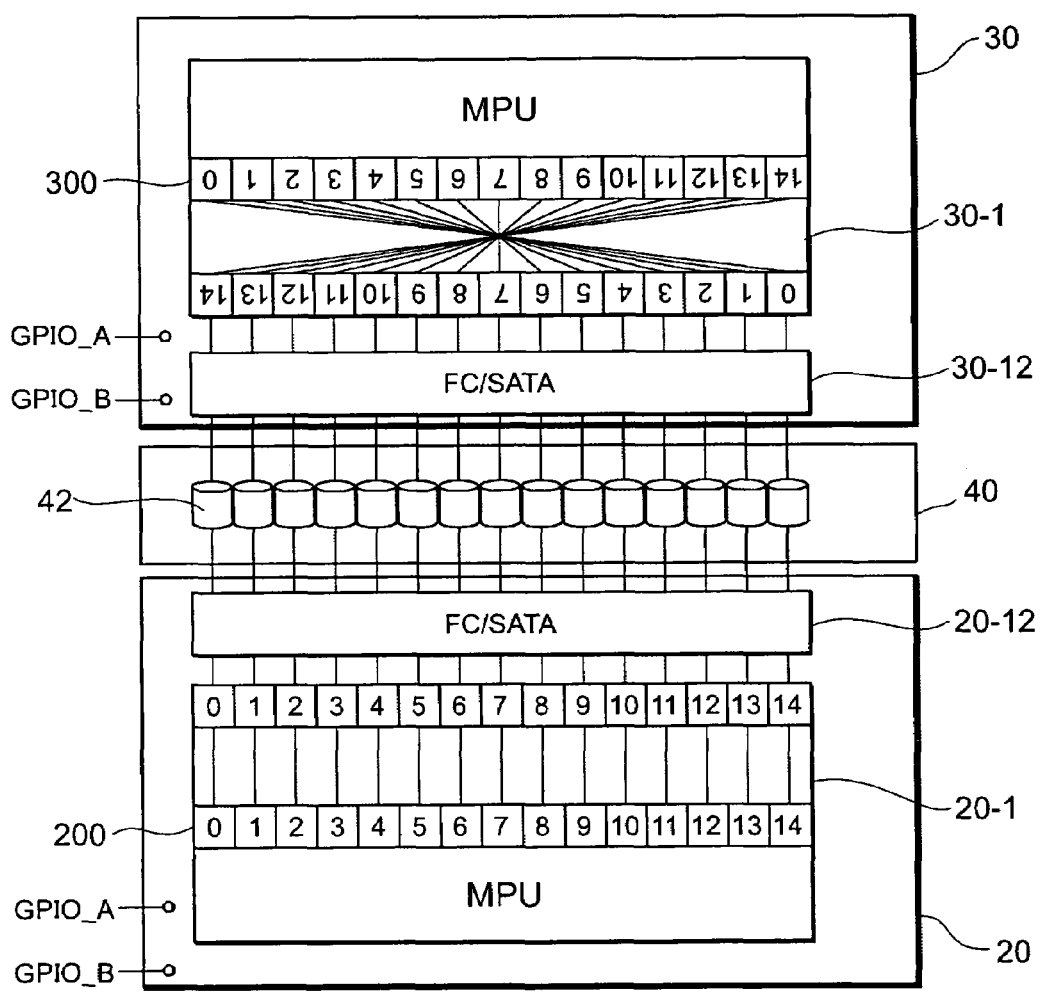
FIG. 22 is a schematic diagram indicating the manner in which an MPU reverses the port arrangement of the reverse-arranged FC/SATA converter.
Figures 23, 24:
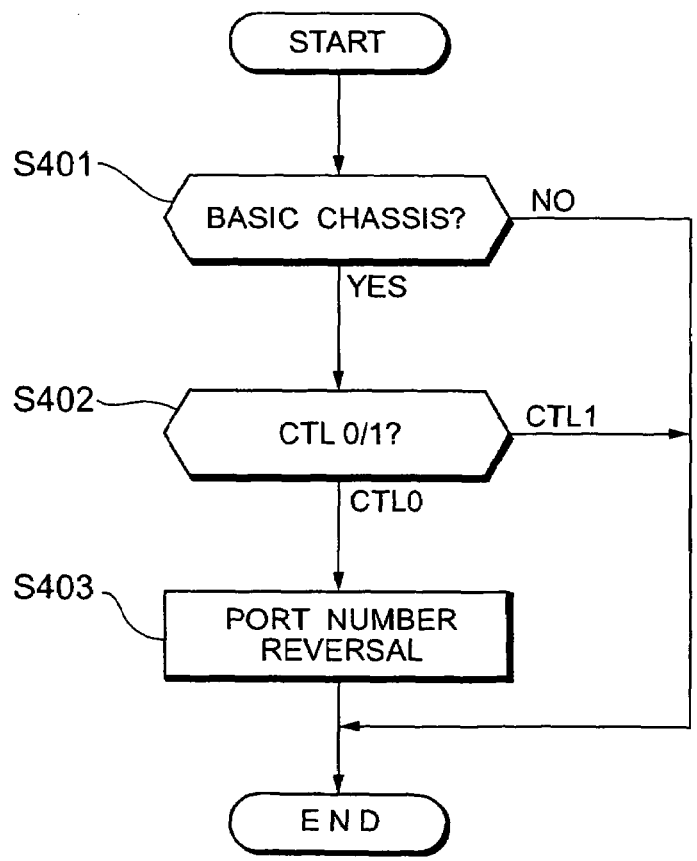
FIG. 23 shows a table indicating the correspondence between a chassis identifying signal logical value, a controller identifying signal logical value, and port number reversal.
FIG. 24 shows a flowchart indicating the processing for reversing the port arrangement of the reverse-arranged FC/SATA converter.

As another method of adjusting for the port number arrangement reversal, as shown in FIG. 22 to FIG. 24, the MPUs 20-1 and 30-1 may respectively automatically detect the reverse arrangement of the controllers 20 and 30, and change the correspondence of the port numbers. As shown in FIG. 22, the controllers 20 and 30 include signal terminals GPIO_A and GPIO_B, and when connected to the back board 40, the logical values of the signal terminals GPIO_A and GPIO_B are set at 0 or 1. GPIO_A is a chassis identifying signal to identify whether the chassis containing the controllers 20 and 30 is the basic chassis 60, or the additional chassis 70. In the case of the basic chassis 60, GPIO_A=0, and in the case of the additional chassis 70, GPIO_B=1. GPIO_B is a controller identifying signal to identify the controller 20 or 30. In the case of the controller 20, GPIO_B=0, and in the case of the controller 30, GPIO_B=1. Here, the additional chassis 70 has no reverse arrangement of the controllers 80 and 90.

Accordingly, when the logical values of the chassis identifying signal and the controller identifying signal are defined, as shown in FIG. 23, it can be understood that the port number arrangement of the FC/SATA converter 30-12 should be reversed when GPIO_A=0 and GPIO_B=1.

A method for reversing the port number arrangement is explained with reference to FIG. 24. In the below explanation, CTL0 refers to the controller 20, and CTL1 refers to the controller 30. The MPUs 20-1 and 30-1 in the controllers 20 and 30 check the logical value of GPIO_A to identify either the basic chassis 60 or the additional chassis 70 (S401). In the case of the basic chassis 60 (S401: YES), the MPUs 20-1 and 30-1 in the controllers 20 and 30 check the value of GPIO_B to identify either the controller 20 or 30 (S402). In the case of the controller 30 (S402: CTL1), the MPU 30-1 reverses the port number arrangement of the FC/SATA converter 30-12 (S403).

As shown in FIG. 22, the MPUs 20-1 and 30-1 each have a management table 200 and 300 for managing the port number arrangement of the FC/SATA converters 20-12 and 30-12. The MPU 30-1 of the reverse-arranged controller 30 reverses the port number arrangement in the management table 300 so that the ports with the same number in the FC/SATA converters 20-12 and 30-12 are connected to an identical SATA disk drive 42.

Furthermore, each of the signal terminals GPIO_A and GPIO_B may be duplex (redundant). When FC/SATA converter firmware is started up, the logical values of the duplex GPIO_A and GPIO_B may be unstable. In that case, it is preferable to move to degraded mode (mode in which no response is given).

Figure 25:
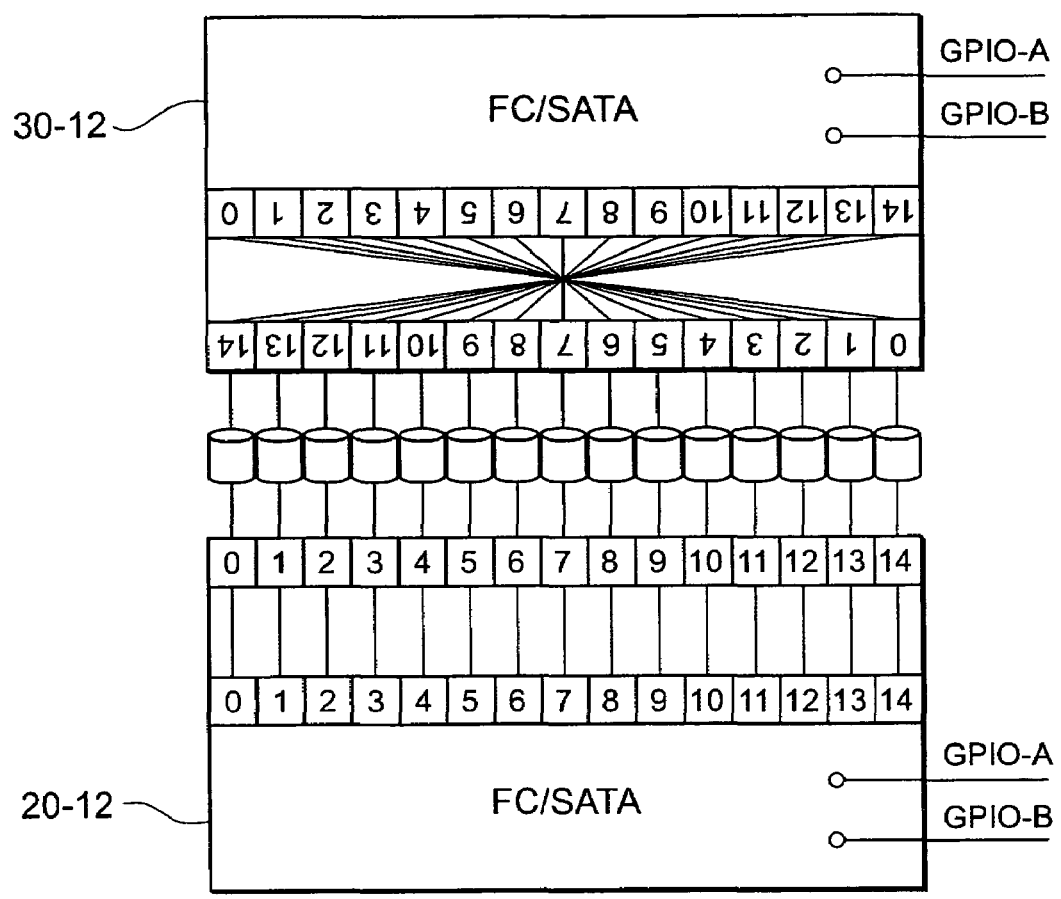
FIG. 25 is a schematic diagram indicating the manner in which a reverse-arranged FC/SATA converter itself reverses its port arrangement.

As another method of adjusting for the port number arrangement reversal, for example, as shown in FIG. 25, the FC/SATA converter 30-12 may reverse its own port number arrangement so that the ports with the same port number in the FC/SATA converters 20-12 and 30-12 are connected to an identical SATA disk drive 42.

The additional chassis 70, compared to the basic chassis 60, has a small number of components and high cooling power. Therefore, there is no need to reversely arrange the controllers 20 or 30, but it is possible to do so.

What is claimed is:

1. A storage controller for performing data communication with a host system based on fibre channel protocol and controlling data input/output to or from a SATA disk drive, comprising:
    an FC/SATA converter powered by a main power supply;
    a resource management processor powered by a standby power supply;
    a switching device for controlling the on/off state of the main power supply;
    a cache memory for temporarily storing data to be input or output to or from the SATA disk drive; and
    a battery for supplying the cache memory with backup power when the main power supply is off,
    wherein the resource management processor controls the power supply from the main power supply to the FC/SATA converter,
    the main power supply and the standby power supply are two power supply channels branching from a single power supply, and
    the FC/SATA converter is powered by the main power supply from a branch power supply line that branches from a power supply line supplying the cache memory with power from the main power supply, and wherein when the main power supply is off, the power supply from the branch power supply line to the FC/SATA converter is interrupted by the switching device being turned off.

2. A storage controller for performing data communication with a host system based on fibre channel protocol and controlling data input/output to or from a SATA disk drive, comprising:
    an FC/SATA converter powered by a main power supply;
    a resource management processor powered by a standby power supply; and
    a switching device for controlling the on/off state of the main power supply,
    wherein the resource management processor controls the power supply from the main power supply to the FC/SATA converter,
    the main power supply and the standby power supply are two power supply channels branching from a single power supply,
    the resource management processor controls the on/off state of the main power supply by controlling the on/off state of the switching device, and
    the resource management processor and the FC/SATA converter are connected to each other via a dedicated signal line for reset processing, and the resource management processor resets the FC/SATA converter via the signal line.

3. The storage controller according to claim 2, wherein the resource management processor and the FC/SATA converter mutually check each other's operating status, and the resource management processor resets the FC/SATA converter if the FC/SATA converter is operating normally.

4. The storage controller according to claim 2, wherein the resource management processor, upon FC/SATA conversion firmware being downloaded to the FC/SATA converter, or immediately after application of power from the main power supply to the FC/SATA converter, resets the FC/SATA converter.

5. A storage system having in a basic chassis a storage controller for performing data communication with a host system based on fibre channel protocol and controlling input/output to or from a SATA disk drive,
    wherein the storage controller comprising an FC/SATA converter powered by a main power supply and a resource management processor powered by a standby power supply,
    the resource management processor controls the power supply from the main power supply to the FC/SATA converter, and
    the basic chassis is connectable to an additional chassis via a fibre channel loop, and upon occurrence of a failure in the fibre channel loop, the connection between the additional chassis and the basic chassis is temporarily cancelled and whether the cause of the failure is present in the basic chassis or the additional chassis is determined.

6. The storage system according to claim 5, wherein the storage system has dual storage controllers, and if the cause of the failure is present in the basic chassis, the storage controller causing the failure is blocked, and data input/output to or from the SATA disk drive is controlled by the storage controller not causing the failure.

7. The storage system according to claim 5, wherein the storage system has dual storage controllers, and if the cause of the failure is present in the additional chassis, the connection between the storage controller causing the failure in the additional chassis and the storage controller in the basic chassis that is connected to the storage controller causing the failure is cancelled.

* * * * *